G. W. WILSON.
Filtering-Faucets.

No. 159,008. Patented Jan. 19, 1875.

Witnesses
J. H. Shumway
C. V. Forbes

Geo. W. Wilson
Inventor
By Atty.
John E. Earle

UNITED STATES PATENT OFFICE.

GEORGE W. WILSON, OF WEST MERIDEN, CONNECTICUT, ASSIGNOR OF ONE-HALF HIS RIGHT TO WILLIAM AND WILLIAM C. HOMAN, OF SAME PLACE.

IMPROVEMENT IN FILTERING-FAUCETS.

Specification forming part of Letters Patent No. 159,008, dated January 19, 1875; application filed December 26, 1874.

*To all whom it may concern:*

Be it known that I, GEORGE W. WILSON, of West Meriden, in the county of New Haven and State of Connecticut, have invented a new Filtering-Faucet; and I do hereby declare the following, when taken in connection with the accompanying drawings and the letters of reference marked thereon, to be a full, clear, and exact description of the same, and which said drawings constitute part of this specification, and represent, in—

Figure 1:
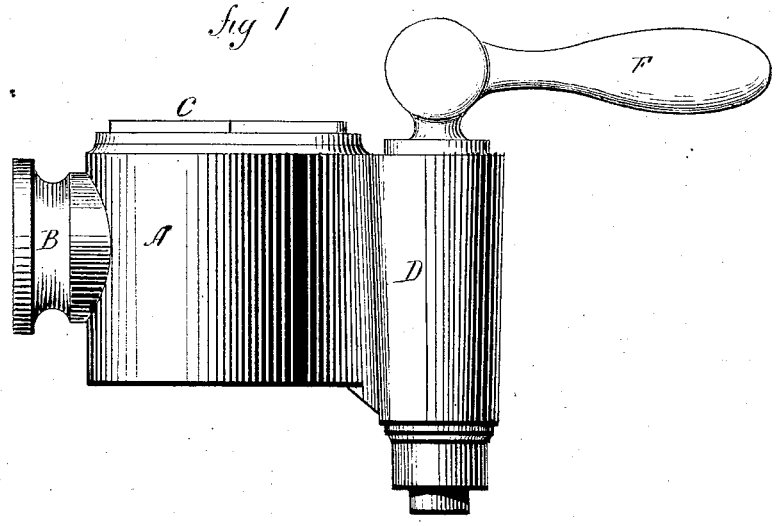
Figure 2:
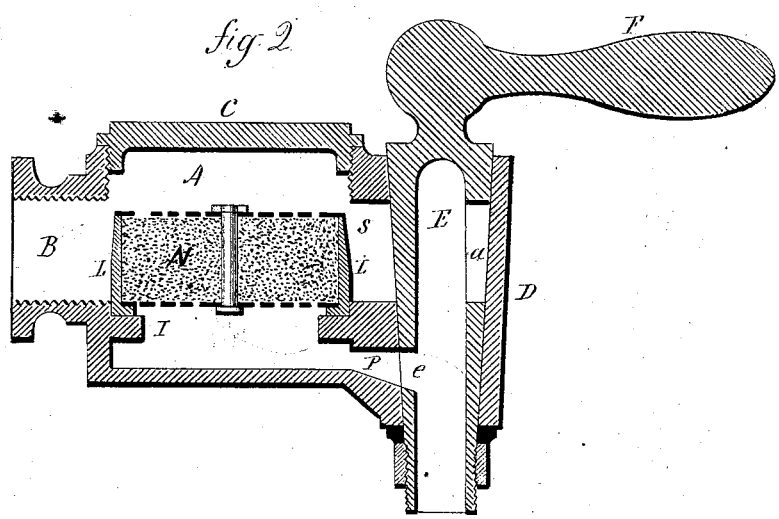

Figure 1, side view; Fig. 2, vertical central section.

This invention relates to an improvement in filters for removing the impurities from water running through supply-pipes, the object being to construct the filter-case and faucet so that at pleasure the water may be drawn either directly or through the filter, as may be desired; and the invention consists in a filter-chamber to receive the water from the supply-pipe, combined with a two-way faucet, one way to take the water directly without passing through the filter, the other way to take the water through the filter, as more fully hereinafter described.

A is the filter-chamber; B, the inlet, and by which the filter is attached to the supply-pipe; C, the cover to close the end of the chamber; D, the faucet-cylinder, in which the plug E is fitted, in the usual manner, so as to be turned freely by the handle F, in the usual manner. Around the filter-chamber, inside, is a flange, I, or projections below the inlet. On this a cylinder, L, is set, filled with the filtering material N. The cylinder fits the chamber closely, or may be packed on the flange I, so that water cannot pass below the filtering material outside; but a free passage for the inflowing water is had above, as seen in Fig. 2, whence it flows, permeating the filtering material to the space below. From this lower space a passage, P, opens to the plug E, and on one side of the plug E is an opening, e, corresponding to the opening P; hence, when the plug is turned to bring these two openings P and e together, the water will flow through the filtering material, thence out through the faucet. In the chamber A, above the filter-seat I, is a second passage, S, opening to the plug E, and in the plug, on the side opposite the opening e, is an opening, a, corresponding to the passage S. When the passage P e is open, the upper passage, S, is closed, as shown in Fig. 2; but by turning the plug half around, or so as to bring the opening a to the passage S, then that passage will be open for the free flow of the water, and the passage P will be closed. This allows a free flow of the water, uninterrupted by the filtering material. An intermediate position of the plug closes both passages.

By this construction is combined in one a free flow and a filtering-faucet, and possessing the additional advantage over common filters that the foreign substances which collect on the filtering material may be washed away or removed by simply opening the free flow.

The cylinder L, to inclose the filtering material, is not essential, as the material itself may pack so as to prevent the flow of water to the passage P, except as it passes through the filtering material; but the inclosing-cylinder is desirable.

I claim—

The herein-described filtering-faucet, consisting of the chamber A, with its inlet B, two outlets, S and P, intermediate filtering material, and the plug E, with its two openings, a and e, corresponding to the outlets S and P, all combined substantially as described.

GEO. W. WILSON.

Witnesses:
C. P. IVES,
T. H. SMETTICK.